United States Patent
Hu et al.

(10) Patent No.: US 11,237,843 B2
(45) Date of Patent: Feb. 1, 2022

(54) APPLICATION-LEVEL RUNTIME ENVIRONMENT FOR EXECUTING APPLICATIONS NATIVE TO MOBILE DEVICES WITHOUT FULL INSTALLATION

(71) Applicant: Beijing Zhanxinzhanli Information Technology Co., Ltd., Beijing (CN)

(72) Inventors: Sen Hu, Beijing (CN); Jinwei Duan, Beijing (CN); Zhewu Zhou, Beijing (CN)

(73) Assignee: BEIJING ZHANXINZHANLI INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/291,835

(22) Filed: Mar. 4, 2019

(65) Prior Publication Data

US 2019/0272178 A1    Sep. 5, 2019

Related U.S. Application Data

(60) Provisional application No. 62/638,379, filed on Mar. 5, 2018, provisional application No. 62/638,391, filed on Mar. 5, 2018, provisional application No. 62/638,407, filed on Mar. 5, 2018.

(51) Int. Cl.
| | |
|---|---|
| *G06F 9/445* | (2018.01) |
| *G06F 9/455* | (2018.01) |
| *G06F 8/70* | (2018.01) |
| *G06F 8/60* | (2018.01) |
| *G06F 9/4401* | (2018.01) |

(52) U.S. Cl.
CPC ............... *G06F 9/445* (2013.01); *G06F 8/60* (2013.01); *G06F 8/70* (2013.01); *G06F 9/4401* (2013.01); *G06F 9/45504* (2013.01); *G06F 9/45533* (2013.01)

(58) Field of Classification Search
CPC ........ G06F 21/53; G06F 21/566; G06F 9/445; G06F 8/60; G06F 8/70; G06F 9/4401; G06F 9/45504; G06F 9/45533; G06N 20/00; G06N 5/003; H04L 63/1416; H04L 67/10
See application file for complete search history.

(56) References Cited

U.S. PATENT DOCUMENTS

| | | | |
|---|---|---|---|
| 2004/0006637 A1* | 1/2004 | Kuacharoen | G06F 9/445 709/231 |
| 2005/0177635 A1* | 8/2005 | Schmidt | G06F 9/52 709/226 |

(Continued)

OTHER PUBLICATIONS

Yi Cui et al.; oStream Asynchronous Streaming Multicast in Application-Layer Overlay Networks; IEEE; pp. 91-106; retrieved on Aug. 27, 2021 (Year: 2004).*

*Primary Examiner* — S. Sough
*Assistant Examiner* — Cuong V Luu
(74) *Attorney, Agent, or Firm* — Perkins Coie LLP

(57) ABSTRACT

A method for processing applications by interfacing between applications and operating systems, executing an application without full installation of the application, and extracting graphical user interface (GUI) content of the application to make the contents indexed and searchable. A system includes a computer system to execute applications in a progressive, installation-free, and/or searchable manner.

14 Claims, 14 Drawing Sheets

(56) References Cited

U.S. PATENT DOCUMENTS

| | | | | |
|---|---|---|---|---|
| 2008/0300851 A1* | 12/2008 | Chakrabarti | ............ | G06F 8/433 |
| | | | | 703/22 |
| 2010/0306270 A1* | 12/2010 | McDiarmid | .......... | G06F 16/284 |
| | | | | 707/796 |
| 2012/0167075 A1* | 6/2012 | Tepper | .................... | G06F 9/445 |
| | | | | 717/178 |
| 2014/0280574 A1* | 9/2014 | Bhakar | ............... | G06F 9/44521 |
| | | | | 709/204 |
| 2018/0174288 A1* | 6/2018 | Kogan | ............... | G06K 9/00604 |
| 2019/0121619 A1* | 4/2019 | Dolph | ................. | G06F 3/04842 |

* cited by examiner

APPLICATION-LEVEL RUNTIME ENVIRONMENT FOR EXECUTING APPLICATIONS NATIVE TO MOBILE DEVICES WITHOUT FULL INSTALLATION

CROSS-REFERENCE TO RELATED APPLICATION

This application claims priority to U.S. Provisional Patent Application No. 62/638,379, entitled "Application-Level Technology for Running Native Mobile Apps in an Indexed and Searchable Manner," by Hu et al., and filed on Mar. 5, 2018, and U.S. Provisional Patent Application No. 62/638,391, entitled "Application-Level Technology for Running Native Mobile Apps in an Installation-Free Manner," by Hu et al., and filed on Mar. 5, 2018, and U.S. Provisional Patent Application No. 62/638,407, entitled "Application-Level Technology for Running Native Mobile Apps in a Progressive, Partly Loaded Manner," by Hu et al., and filed on Mar. 5, 2018. The content of the above-identified application is incorporated herein by reference in its entirety.

TECHNICAL FIELD

The present disclosure relates to computer operating systems and software applications, and more specifically, to techniques for executing applications native to mobile devices without full installation.

BACKGROUND

The ecosystem of World Wide Web users is known to have a "long-tail" user distribution where most users access a small number of popular websites. Beyond the small number of popular websites, the number of users that access websites drastically decrease. In comparison, the ecosystem of mobile applications (e.g., software developed to run on Google™ Android and Apple™ iOS) exhibits an even more extreme "winner-takes-all" user distribution. In other words, most users utilize a few popular applications and very few users utilize less popular apps on the market.

The lack of users for the vast majority of mobile applications may be attributed, in part, to the long download and installation time. For the mobile applications to operate, a full installation to the host operating system is typically required. A full installation may involve verifying that the software is compatible with the operating system and copying code, files and resources to a local storage local of the mobile device. A native software application typically has better performance because it is fully compatible with the operating system and has the code, files, and resources stored locally.

Additionally, users may have difficulty identifying desired applications because, unlike web pages, applications are not indexed and searchable using content within the application. Typically, users need rely on application title names, screenshots, and summaries describing the applications to identify a desired application.

Altogether, the delays associated with the installation, verification, and other processes, as well as the limited search capabilities for locating suitable mobile applications, result in poor user experience that decreases the number of users that are willing to spend the time finding the application they need and to complete the installation process.

BRIEF DESCRIPTION OF THE DRAWINGS

One or more embodiments of the present disclosure are illustrated by way of example and not limited by the figures of the accompany drawings.

DETAILED DESCRIPTION

Figure 1:
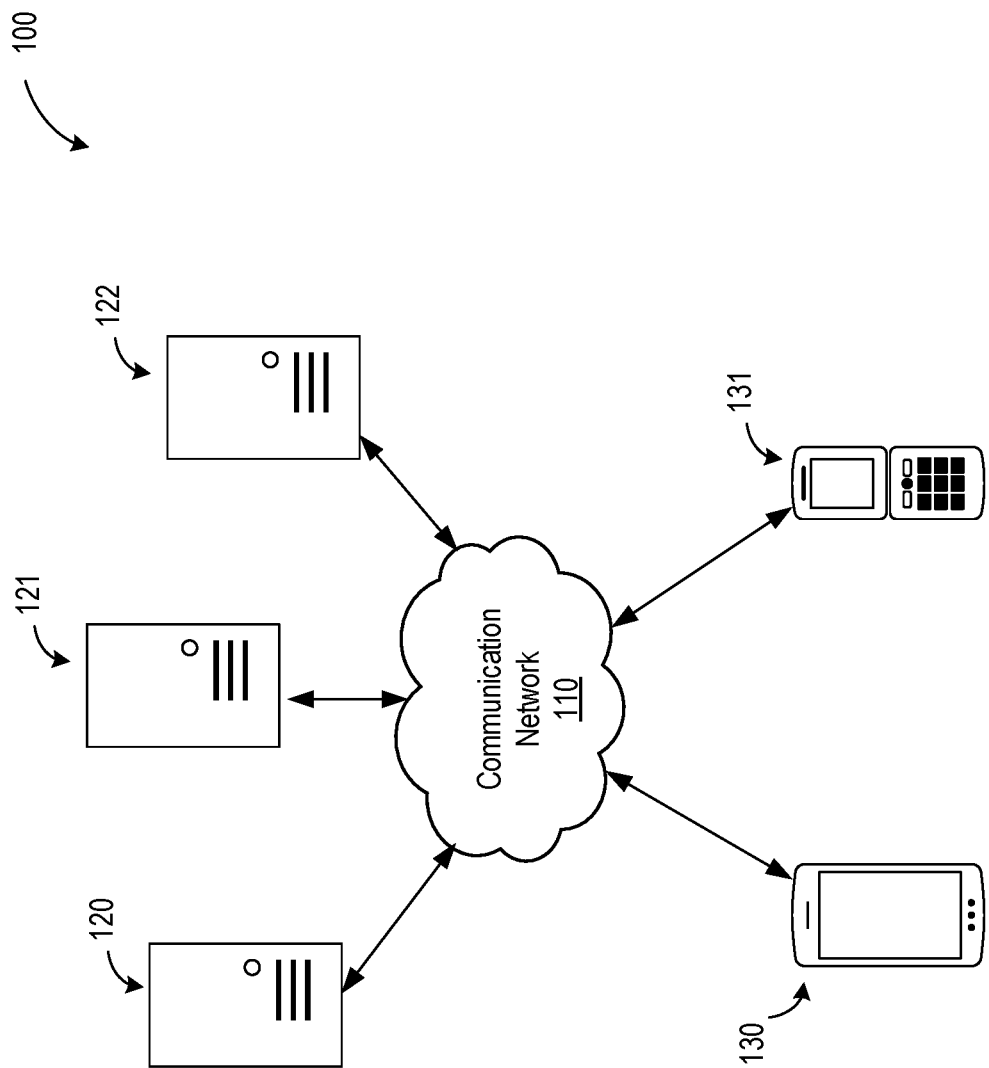
FIG. 1 is a system diagram illustrating an example network system for implementing the meta application system.

As described above, the download and installation process of mobile applications consume time, data bandwidth, and data storage capacity. Additionally, users have difficulty identifying desired applications due to the lack of text-based search capabilities based on content within the application.

One attempt to address the download and installation issue is to utilize a new software framework. Examples of these new software frameworks include Google Play™ Instant, which allows users to try an application before fully installing it on their device. Google Play™ Instant Applications (or "Instant Applications") attempt to reduce the application download and installation overhead by requiring developers to conform with a set of protocols that allows the Instant Application to run on user devices without downloading and installing the package containing the entire Instant Application. Nevertheless, Instant Applications face three shortcomings: first, developers need to re-organize their existing applications at both the feature level and source code level, which could be very costly in terms of time and effort. Second, the vast amount of legacy applications and devices (e.g., Applications developed to run on Android Operating System 6.0 or earlier) are unable to take advantage of Google Play™ Instant due to the incompatible software structure. Third, for devices that access and execute applications without official Google™ services or Google™ framework, such as the more than 600 million Android based devices in China, Instant Applications are not supported.

Developers may build a new application from the ground up to support Google Play™ Instant as part of an Android Application Bundle. However, the application developer must modify the development of their application from conventional development frameworks and processes. Specifically, developers need to split their application into various modules including a base feature module, various feature modules, an installable module, and an instant module. By dividing the application into various modules, Instant Applications modules can be installed as needed rather than all at once. For example, an Instant Application may be launched using only the base feature module. As a user accesses features within the application, the corresponding feature modules are installed.

One attempt to address the accessibility and searchability issue is mobile deep linking. Mobile deep linking allows for a web link or programmatic request to invoke a Uniform Resource Identifier (URI) intent. The URI intent uses a string of characters to identify a particular resource, such as content in a mobile application. For example, once the web URI intent is invoked within an operating system, the operating system attempts to launch the user's designated or available application to handle the URI. In some embodiments, the string of characters resembles a hyperlink used to reference a particular website. Besides referencing mobile application content, the string of characters provides keywords for search engines to index. As a result, the mobile application content is more likely to show up as a search result. This is a strategy employed for search engine optimizations (SEO). However, mobile deep linking requires that the target application is fully installed beforehand, which results in the fundamental, aforementioned issues associated with downloading and installing conventional software applications.

Accordingly, disclosed herein is a meta application system and method that addresses these challenges. Particularly, the meta application system and method provides an application-level runtime environment for executing mobile applications without a full installation. Additionally, the meta application system and method may be configured to index applications based upon the contents of the application. In some embodiments, applications are launched with a minimum bootable subset (MBS). For purposes of discussion herein, the MBS is a mapping of portions of an application at the binary level. The MBS allows an application to be launched without downloading the application's entire binary code. Because the MBS uses the existing binary code base of the application, the meta application system and method does not require rewriting, recompiling, and/or re-packaging an existing application.

After an application is launched using the MBS, additional modules are progressively loaded as they're needed to perform the various functions of the application. Some embodiments provide the optional functionality of indexing applications based on the graphical user interface (GUI) contents of each application. The indexed contents allow users to perform searches for applications and receive relevant search results by matching the users text-based queries with actual contents of the application.

Using the system and methods disclosed herein, the time and effort required to identify and launch a new application is drastically decreased. By reducing the friction of searching and installing an application, the disclosed embodiments reduces the initial barrier for a user to test and run new applications and increase the likelihood that an application is accessed by the user.

System Overview

FIG. 1 is a system diagram illustrating an example network system 100 for implementing the meta application system. The network system 100 includes servers 120-122 and mobile devices 130 and 131. Each of the servers 120-122 and mobile devices 130 and 131 may communicate with each other via communication network 110.

The communication network 110 may comprise one or more networks of any type including packet switched communications networks and/or various other types of telecommunications networks such as local area networks (LAN), wireless local area networks (WLAN), cellular networks (e.g. 4G or 5G networks), plain old telephone system (POTS) networks, Wide Area Networks (WAN), etc. In some embodiments, communication network 110 may provide access to other network connected devices and services. Additionally, or alternatively, servers 120-122 and mobile devices 130 and 131 may communicate via other networks or direct connections.

Servers 120-122 may provide various functionality of the meta application system. For example, the servers may be configured to perform one or more of the following: identify a requested mobile application, determine whether the requested application has been processed by the meta application system, decouple the application into application segments, simulate the execution of the application, generate an acyclic graph associated with the application, store data associated with the application (e.g., MBS, application segments, and acyclic graphs), and transmit the data associated with the application. In some embodiments, one or more of servers 120-122 may be configured as a virtual machine to perform certain tasks such as simulating the execution of the mobile device 130 and/or 131. In other embodiments, one or more of servers 120-122 may additionally be configured as a decoupler to decouple applications into application segments.

Mobile devices 130 and 131 may provide various functionality of the meta application system. In particular, the meta application system may be configured to perform one or more of the following at a mobile device: declare placeholder classes, launch an application, interface between the application and the operating system of the mobile device, load application segments, and/or store data (e.g., MBS, application segments, and acyclic graphs) associated with the application. In some embodiments, the mobile device 130 and/or 131 may each be configured to operate sandbox runtime 700 described in FIG. 7. In other embodiments, the mobile device 130 and/or 131 may additionally be configured to operate a GUI scanner that dynamically detects and indexes GUI components of mobile applications. In some embodiments, mobile devices 130 and 131 may be a portable device such as a smart phone (e.g., iPhone®, Android® phone, or Windows® phone), tablet device (e.g., iPad®, Android® tablet, or Windows® tablet), laptop (e.g., MacBook® Air), or the like.

Activity Diagram Overview

Figure 2:
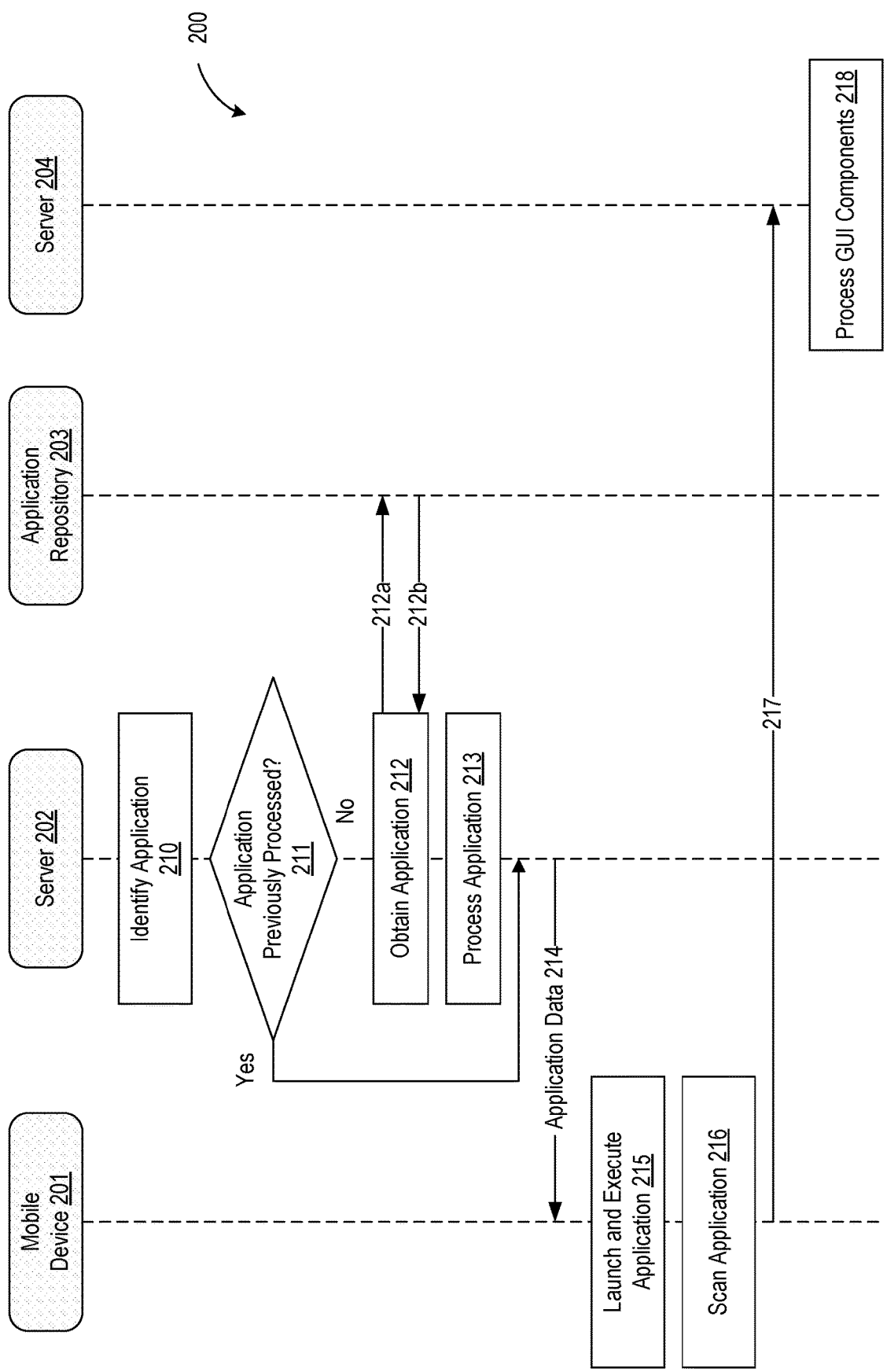
FIG. 2 is an activity diagram illustrating an example process for performing the various functionality of the meta application system.

FIG. 2 is an activity diagram 200 illustrating an example of a method for performing the various functionality of the meta application system. Activity diagram 200 involves processes and communications between mobile device 201, server 202, application repository 203, and server 204. In some embodiments, activity diagram 200 is an overview of the various systems and methods described in subsequent figures. As such, details of some examples of the steps performed in activity diagram 200 may be found in the subsequent figures.

In some embodiments, servers 202 and 204 may provide similar capabilities. Alternatively, servers 202 and 204 may each provide unique functionality that serves the needs of the meta application system. For example, server 202 may perform operations that prepare an application for execution by other devices such as mobile device 201. These operations include identifying a requested application, determining whether the identified application is processed, obtaining the identified application if necessary, processing the identified application, and storing data associated with the processed application. In some embodiments, the details of these operations are provided in FIGS. 3-6. In comparison, server 204 may process applications so that the applications may be indexed and searched based upon the contents of the application's GUI elements. In some embodiments, the details of these operations are provided in FIGS. 11-13.

In step 210, server 202 identifies and obtains an application for processing. Server 202 may identify an application for processing. For example, the application may be identified based upon its popularity, inclusion in a compiled list of applications, a user request etc. In some embodiments, step 210 may be performed according to step 301 described in FIG. 3. In step 211, server 202 determines whether an application identified in step 210 has been previously processed by the meta application system. In some embodiments, step 211 may be performed according to step 302 described in FIG. 3. If the application has not been processed before, then server 202 may obtain the identified application for processing in step 212. For example, in step 212*a*, server 202 may send a request for the identified application to application repository 203. In step 212*b*, server 202 may receive the identified application from application repository 203. In some embodiments, step 212 may be performed according to step 303 described in FIG. 3.

In step 213, after the identified application has been obtained, server 202 may process the application for execution by the meta application system. In some embodiments, processing the application may include one or more of: simulating the execution of the application, decoupling the binary code base of the of the application, generating an acyclic graph of the application, and storing data associated with the application (e.g., the MBS, application segments, acyclic graph, etc.). In some embodiments, step 213 may be performed by a decoupler and/or virtual machine of the meta application system. Additionally, step 213 may be performed in a manner that is consistent with the details described in FIGS. 4-6.

In step 214, server 202 may transmit application data associated with the processed application to mobile device 201. As mentioned above, the application data may include the MBS, application segments, acyclic graph, etc. In some embodiments, the data associated with the application may be transmitted as soon as the application is processed. Alternatively, the data may be stored (e.g., at server 202 and/or 204) and transmitted to mobile device 201 when access to the application is requested by mobile device 201. In some embodiments, the application data may be transmitted from server 202 to mobile device 201 in one transmission. Alternatively, the application data may be transmitted in portions using multiple transmissions.

In one example, the MBS may be initially transmitted such that the application can be launched immediately even if other application segments are not transmitted yet. Then, various application segments are progressively transmitted in one or more transmissions. The transmissions may occur in real-time as the application is executed on mobile device 201. Alternatively, or additionally, transmissions may occur as the application segments are pre-fetched based upon predictions on which application segments will be accessed. Additionally, an acyclic graph may be transmitted to mobile device 201. The acyclic graph may be used to track the state of the application (e.g., the current application segment being accessed) in order to predict the next applications that will be accessed.

In step 215, mobile device 201 launches and executes the application. This step may include one or more of: declaring placeholder classes, launching the application, interfacing between the application and operating system, loading application segments, and storing application data. In some embodiments, step 215 may be performed by a runtime engine (e.g., Sandbox Runtime 700 of FIG. 7) of the meta application system. Additionally, step 215 may be performed in a manner that is consistent with the details described in FIGS. 7-9.

Optionally, in step 216, mobile device 201 scans applications it executes to index GUI components. In some examples, step 216 may be performed by a GUI scanner on mobile device 201 described herein. Alternatively, or additionally, step 216 may be performed by servers 202 and/or 204. In some embodiments, step 216 may be performed in a manner that is consistent with the details described in FIGS. 11-13.

In step 217, mobile device 201 may transmit data associated with the indexed GUI components to server 202 and/or 204 for further processing in step 218. For example, in step 218, the GUI components may be parsed, indexed, and weighed. These steps facilitate an enhanced method for users to search for the application. Step 217 may be performed in a manner that is consistent with the details described in FIGS. 11-13.

Identifying and Obtaining an Application

Figure 3:
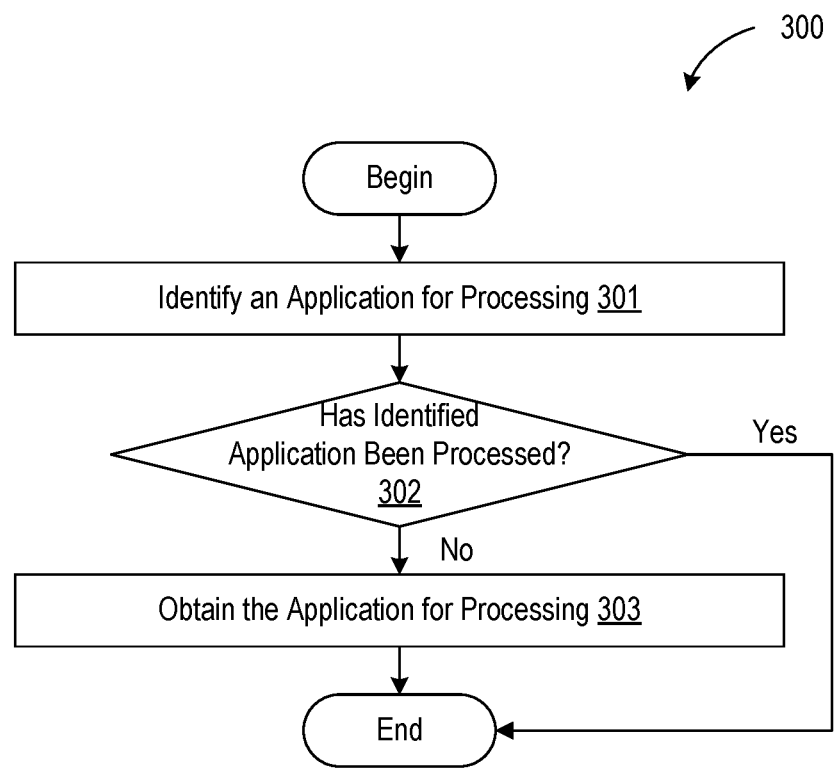
FIG. 3 is a flowchart illustrating an example process for identifying and obtaining an application.

FIG. 3 is a flowchart illustrating a process 300 for identifying and obtaining an application for processing and execution by the meta application system. In some embodiments, the steps in FIG. 3 may be performed by a server (e.g., servers 120-122, 202, and/or 204) in the meta application system.

In step 301, the meta application system identifies an application that the meta application system will process. The application may be identified based upon its popularity, inclusion in a compiled list of applications, a user request etc. For example, the meta application system may identify applications that are listed in a top 100 most downloaded list on the Google™ Play store or Apple™ App Store. Alternatively, the meta application system may identify an application in response to a request for the application from a mobile device. For example, a user may request to access an application from a sandbox runtime on a mobile device, such as mobile devices 130, 131, and/or 201. In response, the sandbox runtime may send a request to a meta application system, such as servers 120, 121, 122, 202, and/or 204 to access the requested application. The server may process the application immediately or add the application to the list of applications that it will process.

In step 302, the meta application system determines whether the identified application has already been processed. In some embodiments, the meta application system may store information associated with processed applications (e.g., the MBS, application segments, acyclic graph, etc.) in a repository. For example, the repository may be implemented on servers 120, 121, 122, 202, and/or 204. The meta application system may then determine whether the identified application is stored in the repository. If the application is stored in the repository, then the identified application has been processed and the meta application system does not need to obtain the application for processing. Rather, the meta application system may provide the already available application data corresponding to the requested application. If the application is not stored in the repository, then the application has not been processed, and the meta application system proceeds to step 303. In other embodiments, the meta application system maintains a list, index, or the like indicating which applications have been processed. The meta application system may examine the list or index to determine whether the identified application has already been processed.

In step 303, the meta application system obtains the identified application from an application repository. In some embodiments, the application repository may be a publicly available marketplace for applications such as the Google Play™ Application store or Apple™ Application Store. However, the application repository may be any collection of applications such as a publicly or privately accessible database. The meta application system may send a query to the application repository. Alternatively, the meta application server may perform a search on the internet, other publicly accessible networks, or privately accessible networks to obtain the identified application.

Processing an Application

Figure 4:
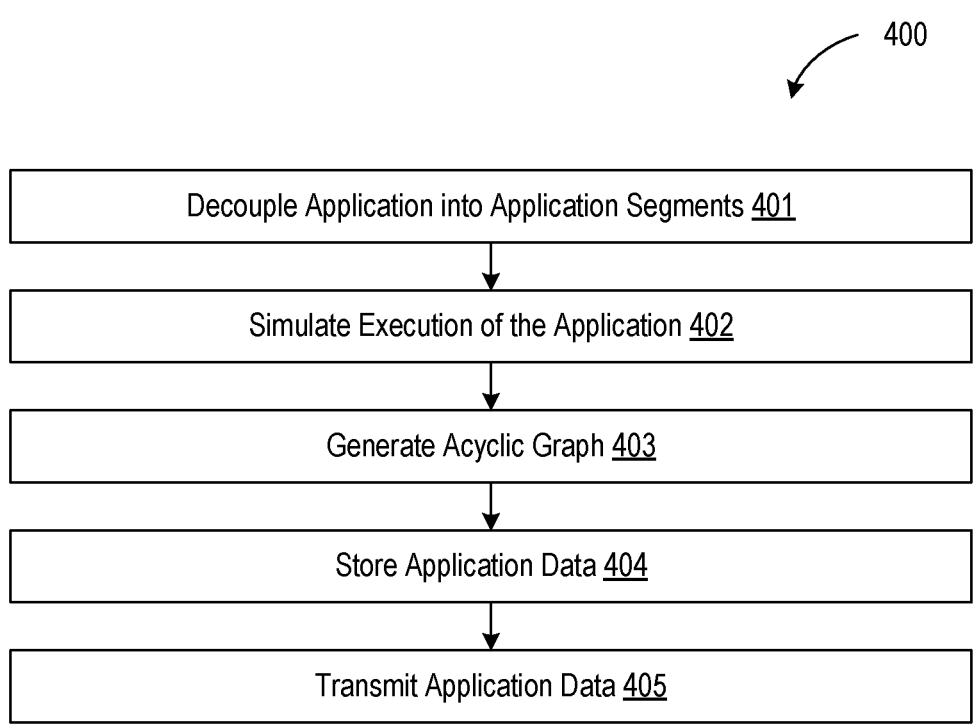
FIG. 4 is a flowchart illustrating an example process for processing an application to allow for launching the application without fully installing the application before launch.

FIG. 4 is a flowchart illustrating an example process 400 for processing an application to allow for launching the application without a full installation. In some embodiments, steps 401-404 may be performed by a decoupler and/or virtual machine operating at servers 120, 121, 122, 202, and/or 204. Additionally, data processed or generated in steps 401-404 may be transmitted to mobile devices (e.g., mobile devices 130, 131, 201, etc.) in step 405.

Decoupling an Application

Initially an application is a collection of compiled programming code and data used to execute the application. The collection of data is gathered into an application package for distribution. For example, applications for Google™ Android are distributed in an Android Package File (APK). In some embodiments, the application package is organized by resources such as: source code, documents, configurations, executables, and binary libraries contained in the distribution package.

In step 401, the meta application system decouples the application package into a plurality of application segments at the binary level. In other words, each application segment corresponds to a portion or segment of the binary code base of the application package. In one example, each application segment corresponds to a portion of the application package such as: the compiled code, binaries to be linked, data sources, manifest files, graphic resources, etc. associated with the application. In some embodiments, a partial set of the application segments may be collected to form the MBS. As described above, the MBS is a portion of an application that allows an application to be launched without downloading the application's entire binary code. In some examples, step 401 may be performed by a meta application system decoupler. In some embodiments, each decoupled application segment may be assigned a value to identify the segment. In some examples, the assigned value may be generated by performing step 601 described in FIG. 6.

Simulating an Application

In step 402, the meta application system may be configured to simulate the execution of the application. In one embodiment, after the binary code base of the application has been decoupled, a virtual machine simulates the execution of the application. The virtual machine may utilize the same application binary interface (ABI) and operating system that are used by an actual user on a mobile device to ensure an accurate simulation. In some embodiments, the virtual machine monitors the internal data bus connecting an external data storage and internal memory during simulation to record the application segments that are accessed during the simulation. The simulation may be performed using various tools such as the QEMU virtual machine, network sniffer tool, or instrumented file system driver. In one example, a network disk is mounted to the QEMU virtual machine and a network sniffer tool (e.g., WireShark) is configured to monitor raw data being transferred between the virtual machine and network disk. In another embodiment, a hooked glibc library may be associated with the QEMU virtual machine.

Generating an Acyclic Graph

In step 403, the meta application system generates an acyclic graph representing the sequence of application segments that are accessed during the simulation. In some embodiments, the generation of the acyclic graph may be performed when the application is executed by a virtual machine on a meta application system. For example, the acyclic graph may be generated by servers 120-122, 202, and/or 204 that are remotely located from mobile devices. The server may provide greater processing power and data storage capacity compared to mobile devices to perform the simulation and generate the acyclic graph. Alternatively, the acyclic graph may be generated by the sandbox runtime at a mobile device. For example, the acyclic graph may be generated in real-time as the user executes the mobile application on the sandbox runtime or the acyclic graph may be updated using data from the real-time execution. In this embodiment, simulation of the application (e.g., step 402) is not required.

The generation of an acyclic graph may be accomplished by performing one or more of the following actions: mapping the various application segments accessed by the application, monitoring the execution of the application to determine which application segments are accessed, determining the sequence that the application segments are accessed, generating an entry in the acyclic graph when an application segment is accessed, and recording the matched application segment as the next entry in the acyclic graph. In some embodiments, step 403 may be performed according to the steps described in FIG. 6.

Storing the Application Data

In step 404, the meta application system may store application data including the MBS, application segments, the acyclic graph, predictions on what application segments will be accessed, and other data associated with the application. In some embodiments, the MBS and application segments are made available to mobile devices 130, 131, and/or 201 so that they may be readily transmitted to mobile devices that wish to launch and execute the application. In some embodiments, the prediction data is stored to determine what application segments should be made available or preemptively transmitted by a server or prefetched by a mobile device. When a prediction of the next application segment is made, the application segment may be preemptively transmitted to a mobile device.

Transmitting the MBS and Application Segments

In step 405, the meta application system may transmit the various application data processed or generated in steps 401-404. For example, servers 120, 121, 122, 202, and/or 204 may transmit the various application data to mobile devices 130, 131, 201, etc. In some embodiments, the various application data includes the MBS, application segments, acyclic graphs, application assets, and resources. The application assets and resources are data that facilitates the use of the application. For example, the assets and resources may be graphics, audio files, graphical user elements, data sets, etc. The server may transmit the assets and resources preemptively based upon a prediction that the application segment will be accessed, or in response to a request from the application for the asset or resource.

In one example, the meta application system may first transmit the MBS to a mobile device. The MBS may be transmitted preemptively before a user requests to launch the application or in response to a request by the user to launch the application. The meta application system may then optionally transmit various application segments. Additionally, the meta application system may transmit other application data with the MBS and/or application segments. A person of ordinary skill in the art will recognize that the various application data may be transmitted using different sequences or transmitted simultaneously.

Example of Application Package

Figure 5:
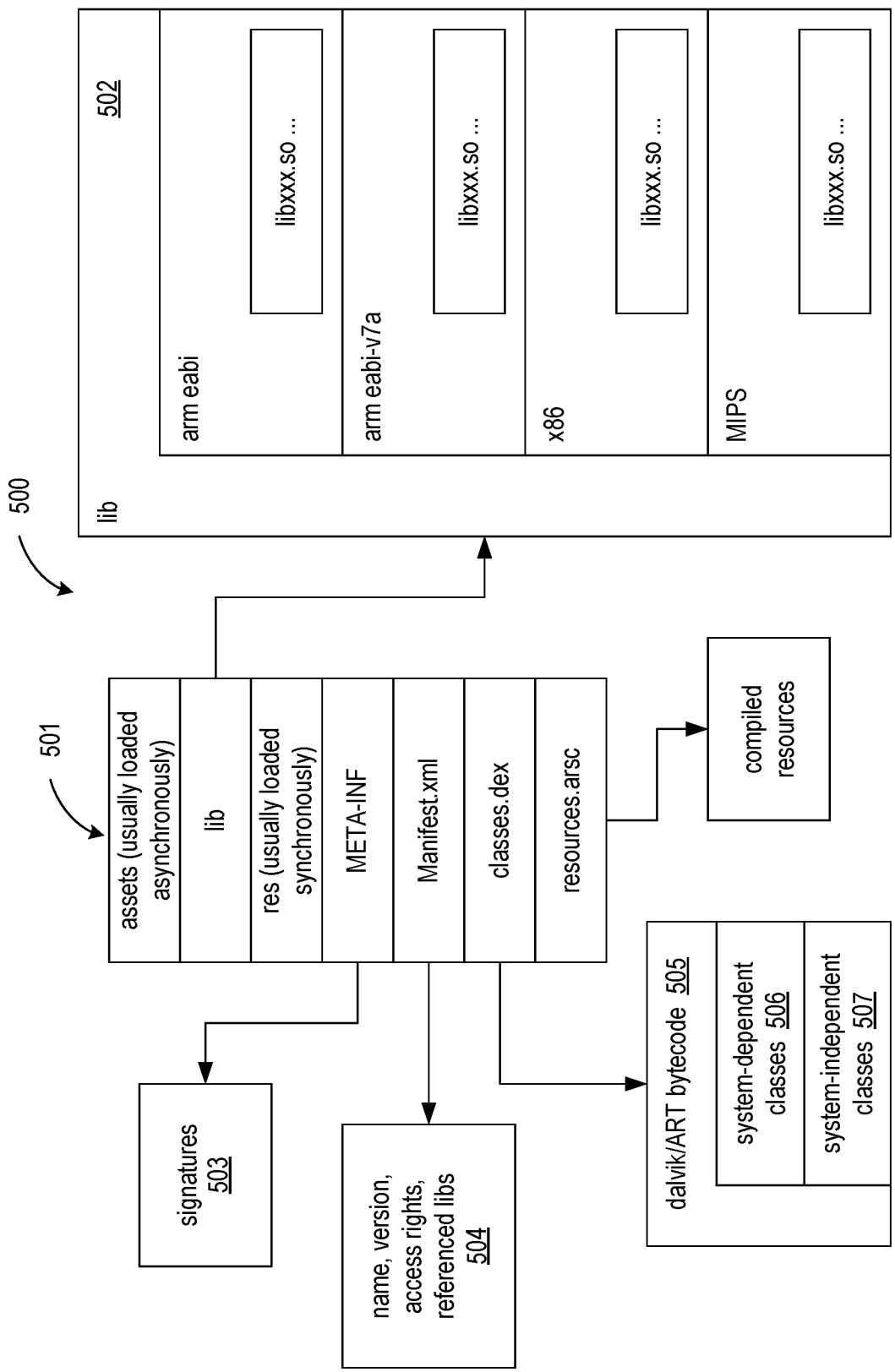
FIG. 5 is a block diagram depicting various components of an application package.

FIG. 5 is a block diagram depicting an example APK used to distribute the application in the meta application system. In some embodiments, the segments may be represented as folders in the package file.

The APK may include the central application segments 501 of the application. The central application segments 501 may include assets, library files 502, res, META-Inf 503, manifest.xml 504, classes.dex, and resources.arsc. In turn, library files 502 may contain data corresponding to different processor architectures such as ARM EABI, ARM EABI-v7a, x86, MIPS, etc. Similarly, the META-inf 503 folder may contain various signatures 503. The Manifest.xml file 504 may provide manifest data including the name, version, access rights, and reference libraries associated with the application. Classes.dex may contain the dalvik/ART bytecode 505, which contains both the system-dependent classes 506 and system-independent classes 507.

In some embodiments, the APK may be decoupled into various application segments. The application segments may correspond to the various parts of the central application segments 501. For example, one particular application segment may correspond to the manifest.xml file. The manifest.xml includes the name, rights, version, access rights, and referenced libraries of the application. This information is critical for launching the application and therefore the application segment corresponding to the manifest.xml file may be part of the application's MBS.

In another example, one particular application segment may correspond to the assets portion of central application segments 501. The assets are typically loaded asynchronously (i.e., the various assets are loaded at different times). Since the assets may not be needed at launch, the application segment corresponding to the assets may not be a part of the application's MBS. In yet another example, one particular application segment may correspond to the resources ("res") portion of central application segments 501. The res portion includes structures for the frontend (i.e., portions of the application that interact with the user). The resources are typically loaded synchronously (i.e., the various assets are loaded at the same time). Since the assets may be needed at launch, the application segment corresponding to the res section may not be a part of the application's MBS.

In some embodiments, the decoupling of the application binary code base includes extracting the classes.dex into system-dependent classes and system-independent classes. System-dependent classes include inherited Android framework classes such as Activity, Service or Broadcast Receiver as described in FIG. 10. The system-independent classes include user-defined classes and third-party library classes.

Example of Generating Acyclic Graph

Figure 6:
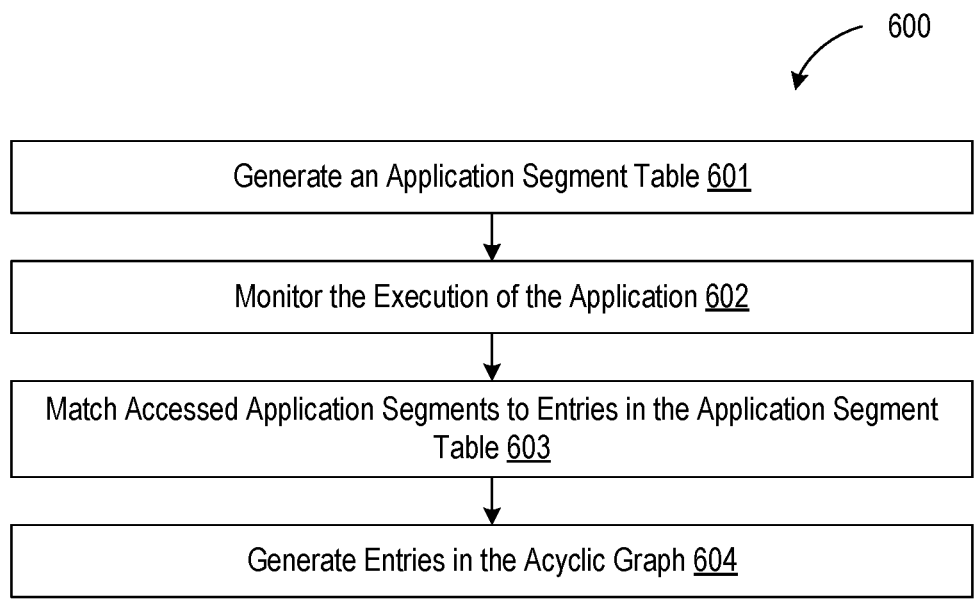
FIG. 6 is a flowchart illustrating an example process for generating an acyclic graph.

FIG. 6 is a flowchart illustrating an example process 600 for generating an acyclic graph. In some embodiments, an acyclic graph may represent an ordered list of dependences of the application segments. Specifically, the ordered list represents the sequence in which application segments are accessed during execution of the application. The ordered list may record the actual order that application segments are were accessed, or it may represent a prediction of the order that application segments are likely to be accessed. In some embodiments, the initial entry in the acyclic graph contains the application segment or segments that are initially indispensable to launch the application, which may be identified as an MBS.

In some embodiments, each node in the acyclic graph may represent an application segment and each edge is a directed edge that represents the transition from access of one application segment to access of the next application segment during execution of the application. By having an acyclic graph, there are no graph circles and thus there is an obvious start and end node path (i.e., the first application segment that is accessed and last application segment that is accessed is obvious).

By generating an acyclic graph, the meta application system can predict application segments that will likely be accessed during the execution of the application. For example, the meta application system may look at the current application segment being accessed and find the next node in the acyclic graph to determine the next application segment that will be accessed. Based on the prediction, the meta application system can prefetch the predicted application segments from a remote location. When an executed application requires the prefetched application segment, that segment is already downloaded and available for use. By being available immediately, any delay that might result from not having the entire binary code base downloaded locally is eliminated or mitigated. The performance is likely the same or at least similar to an implementation where the entire binary code base is downloaded before the application is launched (e.g., by performing a full installation).

In one illustrative example, the sequence in which application segments are accessed during the execution of an application may indicate that application segments A-D are accessed during execution. The record shows segment A is accessed first during execution. In some embodiments, segment A may be the MBS. The record also shows that after segment A is accessed, segment B is accessed 80% of the time, segment C is accessed 10% of the time, and segment D is accessed 10% of the time after segment A. Therefore, the meta application system can predict that the application will most likely access segment B after segment A. Therefore, the meta application system may prefetch segment B after segment A is accessed. By having segment B prefetched and available, the meta application system can avoid any delays that may result from having to retrieve the segment after it has been requested. This is especially true when the segment is stored remotely. After segment B is downloaded, the meta application system may continue by prefetching segment C and segment D. In some embodiments, because segment C and segment D are predicted to have an equal probability of being accessed next, they may be retrieved concurrently. Alternatively, they may be retrieved sequentially in any order.

Returning to process 600, the meta application system generates an application segment table in step 601 by mapping the various application segments accessed by the application during a monitoring step. In some embodiments, the meta application system may index, list, or otherwise identify all the application segments of an application.

For example, the meta application system may then execute a hash function (e.g., a MD5 hash) on each application segment to generate a hash value identifying the application segment. Alternatively, the meta application system may map the application segments using coordinate pair data. For example, the value may be a X-Y coordinate pair used to identify the location of the application segments within the binary code base of the application package. The X value may represent the offset from the start of binary code base. For example, a X value of zero represents the start of the binary code base. A X value of 128 indicates that the application segment starts at 128 bytes from the start of the binary code base. The Y value represents the length of the binary segment. For example, a Y value of 248 indicates that an application segment has a length of 248 bytes. Therefore, a X-Y value of (128, 248) represents an application segment starting at 128 bytes from the start of the binary code base and ending at 376 bytes from the start of the binary code base.

In step 602, the meta application system monitors the execution of the application to determine which application segments are accessed and the sequence that the application segments are accessed. In some embodiments, a virtual machine of the meta application system may monitor the execution of the application during simulation before the application is accessed by a user. Alternatively, or additionally, the meta application system may monitor the execution of the application in real-time when the application is accessed by a user using the sandbox runtime. In some embodiments, the data bus of the meta application system is monitored to determine which portion of the binary code base is accessed. In some embodiments, a virtual machine examines instructions that load raw data from data storage (e.g., local memory that is accessed by a processor executing the mobile application) to internal registers of the processor.

In step 603, the meta application system matches application segments that are accessed to application segments on the application segment table. In some embodiments, an application segment that is accessed during monitoring step 602 is mapped to entries in the application segment table generated in step 601. For example, the meta application system may hash the application segment being accessed and map the resulting hashed value to an entry stored in the application segment table. Alternatively, the meta application system may determine the X-Y value of the application segment being accessed and map the value to an entry stored on the application segment table. By mapping the application segments being accessed, the virtual machine can record which application segments.

In step 604, the meta application system generates a node in an acyclic graph when a match is detected in step 603. For example, the meta application system may mark or flag the matched application segment as "accessed" on the application segment table. Additionally, data may be assigned or generated to indicate the application segments chronological relationship to other application segments that are accessed. For example, a time stamp or value indicating a sequential order may be stored with the application segment entry of the application segment table.

In some embodiments, the meta application system stops recording the application segments that are accessed when all the application segments of the binary code base have been marked as loaded at least once. Alternatively, the meta application system may continuously record the application segments that are accessed by performing a plurality of simulations. By continuously recording the order of components accessed during the simulations, the meta application system can update and refine the prediction of when the application segments will be accessed. Additionally, or alternatively, the meta application system may also record the order in which the application segments are accessed when a user executes and uses an application in real-time. Specifically, when the sandbox runtime executes an application for a user, the order in which an application segment is accessed is based upon the feature or portion of application that the user accesses. By recording the order in which an actual user accesses application segments, the ordered list can be updated and refined.

Sandbox Runtime

Figure 7:
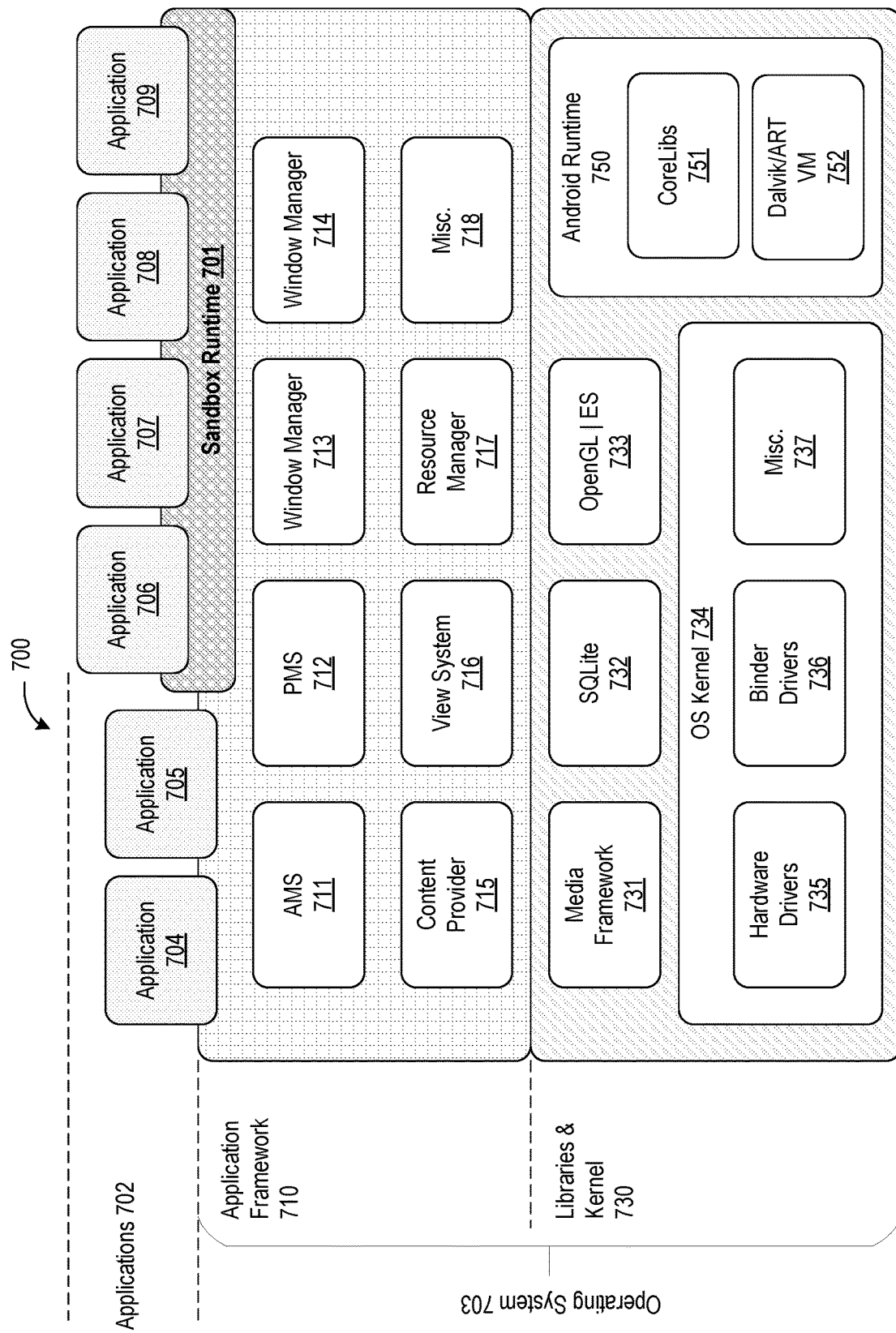
FIG. 7 is a system diagram illustrating an example system for operating a sandbox runtime to interface between applications and an operating system.

FIG. 7 is a system diagram illustrating an example system 700 for operating a sandbox runtime to launch a mobile application and interface between the application and a host operating system. Example system 700 contains a sandbox runtime 701, applications 702, and operating system 703. Among applications 702, application 704 and 705 are executed by interfacing directly with operating system 703 rather than sandbox runtime 701. In contrast, applications 706-709 are executed by interfacing with sandbox runtime 701 that functions as an interface to operating system 703.

Operating system 703 includes application framework 710 and Libraries & Kernel 730. Application framework 710 includes java classes that are defined to provide high-level services to applications. Application framework 710 may include Android Manager Service (AMS) 711, PMS 712, WindowManager 713 and 714, Content Provider 715, View System 716, Resource Manager 717, and miscellaneous framework components 718. In one example, AMS 711 is a java class that interacts with activities and services as described in FIG. 9.

Libraries & Kernel 730 include libraries that are used to provide access to various services and data resources. Libraries & Kernel 730 may include media framework 731, SQLite 732, OpenGL|ES 733, OS Kernel 734, and Android Runtime 750. In one example, SQLite 732 includes java classes that facilitate database management. In another example, OpenGL|ES 733 provides java classes that facilitate graphics rendering. In further detail, OS Kernel 734 includes Hardware Drivers 735, Binder Drivers 736, and miscellaneous kernel components 737. OS runtime 750 includes CoreLibs 751 and Dalvik/ART VM 752.

By functioning as an interface for applications 706-709, sandbox runtime 701 may facilitate access privilege to resources provided by operating system 703. In some embodiments, operating system 703 is unaware that applications 706-709 has been executed. Therefore, applications 706-709 may not have direct access privilege to resources provided by operating system 703. However, sandbox runtime 701 may provide access privilege for applications 706-709. For example, sandbox runtime 701 may provide applications 706-709 with access privilege to hardware resources (e.g., a camera system and network interface of a mobile device) controlled by the Linux kernel of operating system 703. Additionally, sandbox runtime 701 may provide privilege access to user data (e.g., user contacts, login credentials, etc.) via content provider 715 classes of operating system 703.

Additionally, sandbox runtime 701 may improve the user experience of the meta application system by consolidating requests to users for access privilege to user sensitive resources. For example, without sandbox runtime 701, each application 704 and 705 may individually request users for access privilege to user sensitive resources such as the user's contact list, user's location information, etc. In contrast, sandbox runtime 701, may initially request access privilege to user sensitive resources from the user. By obtaining access privilege from the user, sandbox runtime 701 may in turn provide access privilege to those resources to applications 706-709. For example, sandbox runtime 701 may request access privilege to a user's contact list. Once the user grants access privilege to the contact list, sandbox runtime 701 may control which applications 706-709 has access to that resource. For example, sandbox runtime 701 may specifically provide access privilege to particular applications such as applications 706 and 707. A person of ordinary skill in the art would recognize that other access privilege schemes may be utilized. For example, certain types of applications (e.g., communications and social applications) may receive access privilege to a user's contact list. Access privilege may also be determined based upon the publisher of the application (e.g., applications published by Google™), the date the application was launched on sandbox runtime 701, whether the application is on a whitelist, whether the application is not on a blacklist, etc. Additionally, some applications may have access privilege to some resources but no access privilege to other resources.

Executing an Application

Figure 8:
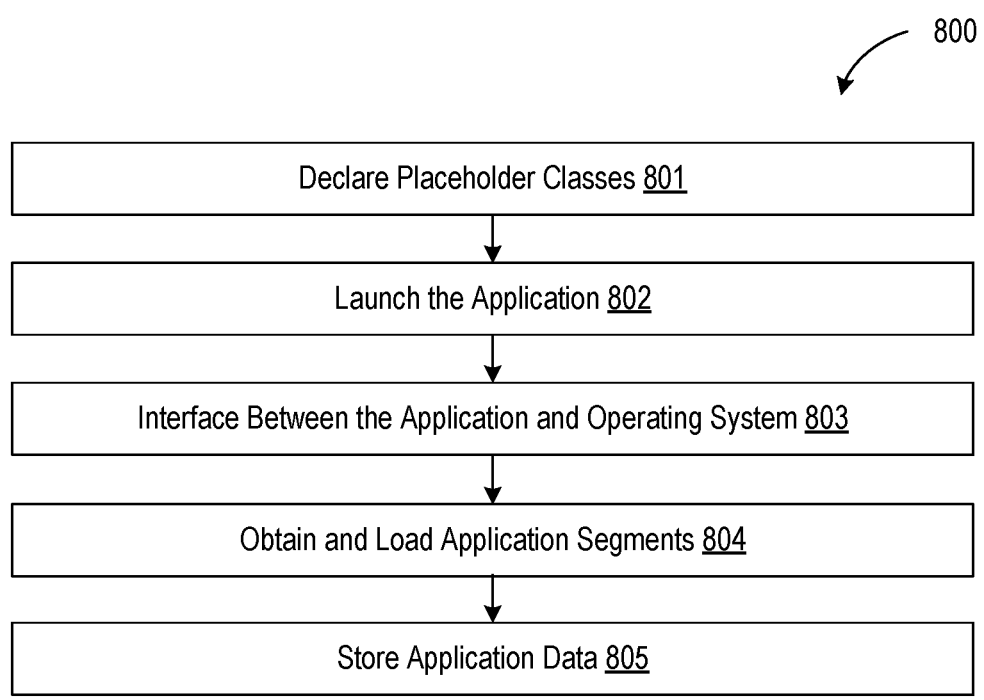
FIG. 8 is a flowchart illustrating an example process for launching and executing applications.

FIG. 8 is a flowchart illustrating an example process 800 for executing an application using the meta application system. In some embodiments, the process may be performed by sandbox runtime 701. As described above, sandbox runtime 701 acts as an interface between applications 706-709 and operating system 703. In some embodiments, sandbox runtime 701 is itself an application that is installed on operating system 703 in order to operate. Once sandbox runtime 701 has been installed on operating system 703, applications executed on the sandbox runtime (e.g., applications 706-709) do not require a full installation.

Conceptually, operating system 703 has no knowledge of applications 706-709 running on sandbox runtime 701. Similarly, applications 706-709 running on sandbox runtime 701 has no knowledge of running atop sandbox runtime 701 rather than the underlying operating system 703. All interactions between application 706-709 and operating system 703 are proxied via sandbox runtime 701. For example, sandbox runtime 701 manages programmatic calls between applications 706-709 and operating system 703.

In step 801, sandbox runtime 701 declares placeholder classes that are later used to make calls to operating system 703 to request actual classes required by applications 706-709. In some embodiments, operating system 703 requires that all the system-defined classes required by an application are pre-registered. The declaration may be made via a manifest file when the application is installed on the operating system. Therefore, to meet the registration requirements of operating systems, sandbox runtime 701 may initially provide a dynamic manifest file to operating system 703 that registers placeholder system-defined program classes. Specifically, the sandbox runtime's manifest file declares placeholder system-defined classes (e.g., activities, services, content providers, broadcast receivers, and intent classes) that are later replaced by actual system-define classes requested by executed applications. The placeholder system-defined class includes functionality to retrieve information from intent calls as described below.

In step 802, sandbox runtime 701 launches one or more of applications 706-709 without a full installation. To accomplish this, sandbox runtime 701 executes one or more of applications 706-709 by loading an MBS rather than the entire binary code base of the application package. In some embodiments, the MBS is determined during a decoupling process as described above and especially in FIG. 4.

In step 803, sandbox runtime 701 functions as an interface between applications 706-709 and operating system 703 by retrieving application segments from a location that is remote to the mobile device executing operating system 703. By retrieving application segments for applications 706-709, sandbox runtime 701 allows applications to access to remotely stored application segments as local resources.

In one example that doesn't utilize sandbox runtime 701, an unmodified intent call is transmitted from application 704 to operating system 703. When an application wants to provide a specific functionality, it generates and transmits an intent call directed to the host operating system. The intent call contains parameters that indicate the class required by application 704. Operating system 703 parses the received intent call, analyzes the various parameters of the intent call, and launches an activity indicated by the intent call.

In a contrasting example that utilizes sandbox runtime 701, application 706 generates and transmits an intent call intended for operating system 703. Instead of reaching operating system 703, the intent call is intercepted by the sandbox runtime 701. Sandbox runtime 701 then parses the intent call to determine the activity or class indicated by the target field of the intent call. Sandbox runtime 701 then initiates an idle (i.e., not occupied) placeholder activity that was previously declared (e.g., declared by sandbox runtime 701's manifest file). The initiated placeholder activity is in turn transmitted to operating system 703 to launch the activity indicated by the intent call.

For example, application 706 may want to initiate the "VideoPlaybackActivity" activity class. Application 706 requests the "Video PlaybackActivity" class by generating an intent call with a target field designating "VideoPlaybackActivity" and transmitting the intent call to operating system 703. A proxy system handler of sandbox runtime 701 intercepts the intent call and extracts the information from the target field. Since application 706 was not fully installed on the host operating system (i.e., it did not provide a manifest file to operating system 703 declaring requested classes), the "VideoPlaybackActivity" class requested by application 706 is not registered nor available for use. However, as described above, sandbox runtime 701 previously declared placeholder classes using its own manifest file that was parsed by operating system 703. Sandbox runtime 701 replaces the target field of the intent call with a placeholder activity and saves the activity name and associated information in a self-defined field of the placeholder activity. The modified placeholder activity is then passed to operating system 703. After receiving the modified placeholder activity, operating system 703 calls lifecycle functions corresponding to the requested class. In this way, the "VideoPlaybackActivity" Activity is initiated to facilitate the operation of application 706 using the sandbox runtime placeholder classes. Other classes and activities in Google™ Android applications may also be proxied by their placeholder counterpart in sandbox runtime 701 and launched accordingly.

In step 804, sandbox runtime 701 obtains and loads one or more application segments to support the operation of applications 706-709. In some embodiments, the application segments correspond to a requested local resource and may be downloaded from a remote server (e.g., servers 120, 121, 122, 202, and/or 204). For example, sandbox runtime 701 loads application segments based upon the user interaction with the executed application. In another example, the sandbox runtime loads application segments based on requests from the application for a local resource, such as compiled code, binaries to be linked, data sources, manifest files, graphic resources, etc. In yet another example, the resources are prefetched based upon a prediction of the application segment that will be accessed according to an acyclic graph associated with the executed application. In other words, the application segments are obtained by sandbox runtime 701 before the application requests them. As described above, the predictions may be based upon an acyclic graph that represents an ordered list of application segments.

In step 805, sandbox runtime 701 may store application data including the MBS, application segments, acyclic graphs, and other data associated with the application. In some embodiments, each time an application is launched, an instance of that application is executed until the instance is terminated. Sandbox runtime 701 may maintain a set of application data for each instance of an application. The application data for each application instance may include a state machine that indicates which application segments have been accessed by the instance of the application. The state machine may be based upon an acyclic graph of the application. Since the acyclic graph remembers which application segment is being accessed, it can predict which application segment will be accessed subsequently.

In some embodiments, each state machine tracks the progress of the instance along the acyclic graph corresponding to the application. When an application instance first launches, a copy of the application's acyclic graph is initialized at the initial state (e.g., the initial state corresponding with the application instance accessing the MBS for launch). When the instance accesses a subsequent application segment during operation, sandbox runtime 701 updates the state machine such that the current state indicates that the application instance accessed the subsequent application segment.

In another example, when a second instance of the application (at the same device or a different device) is launched, a second state machine based on the application's acyclic graph is initiated. That is, the current state of the second application instance is the initial state at application segment A. In a similar manner to the first state machine, the second state machine progresses based upon which application segment is accessed by the second application instance.

Sandbox Runtime Functionality

Figure 9:
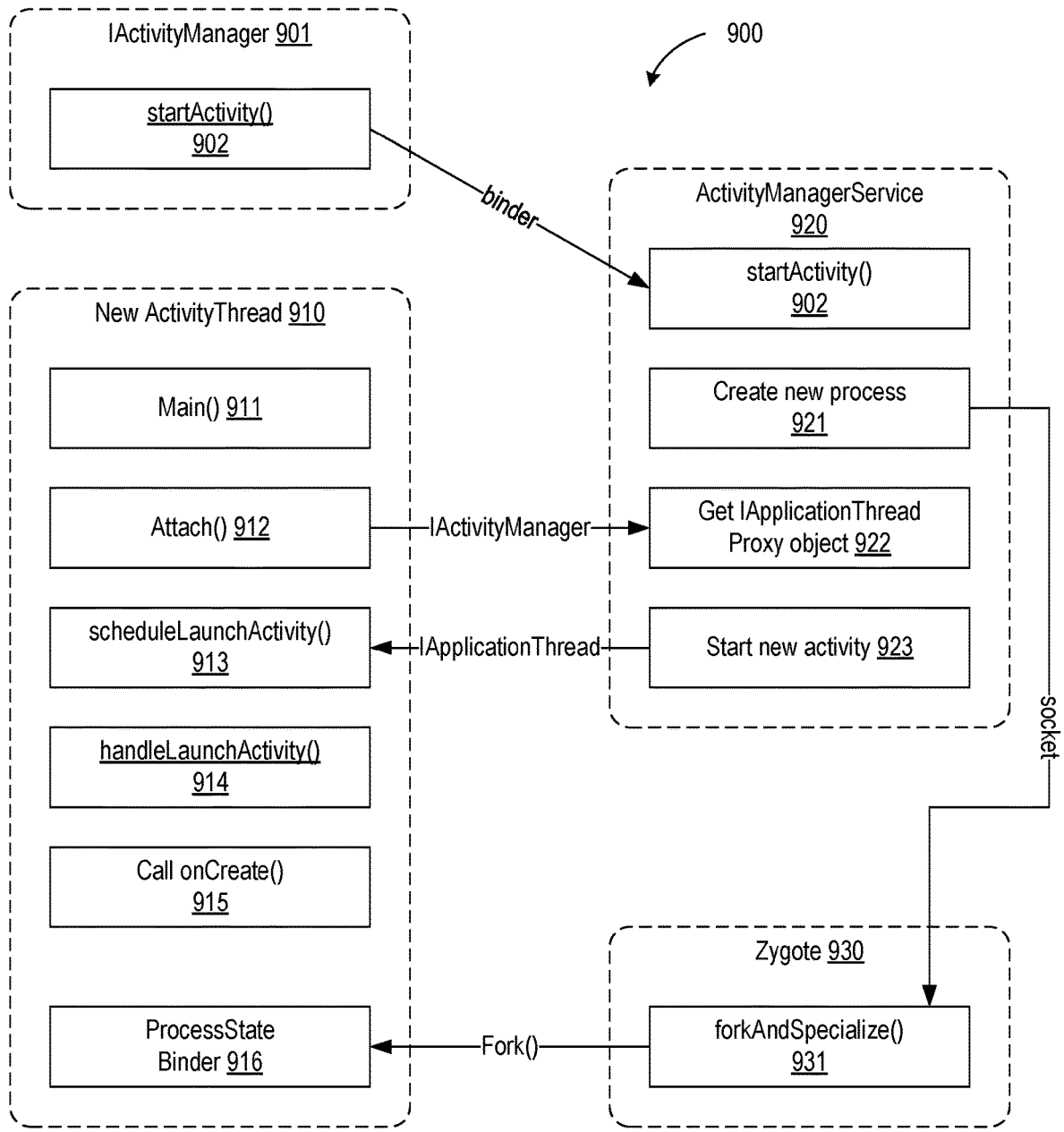
FIG. 9 is a diagram illustrating an example process for executing an application.

FIG. 9 is a diagram illustrating an example a process 900 for interfacing between an application and operating system by using a chain of function calls described herein. For example, process 900 may be performed by sandbox runtime 701 of FIG. 7. Additionally, AMS 920 may be an example of AMS 711 that is hosted on operating system 703 as described in FIG. 7.

At the start of process 900, a sandbox runtime interfaces between an application and operating system by receiving a request for a class or activity from an application. Specifically, two Android framework function calls (i.e., startActivity( ) 902 and handleLaunchActivity( ) 914) are proxied using InvocationHandler and Proxy Java classes. StartActivity( ) 902 is called by an application requiring a specific class or activity. It contains an intent specifying the requested class or activity and is passed in as a parameter to AMS 920 associated with the operating system. HandleLaunchActivity( ) 914 extracts the requested intent and reconstructs the requested class or activity.

In response to the startActivity( ) call, AMS 920 returns a new activity 923 that is passed to scheduleLaunchActivity( ) 913 of ActivityThread 910. Additionally, ActivityThread 910 invokes attach( ) 912 with lApplicationThread proxy object 922 of AMS 920. AMS 920 in turn creates a new process 921 that is passed to forkAndSpecialize( ) 931 of zygote 930. Zygote 930 then calls fork( ) to invoke ProcessState Binder 916.

Through this set of function calls, process 900 facilitates an interface for applications to request classes or activities from an operating system. Process 900 allows applications to access classes or activities even if they were not previously declared through an installation process.

Figure 10:
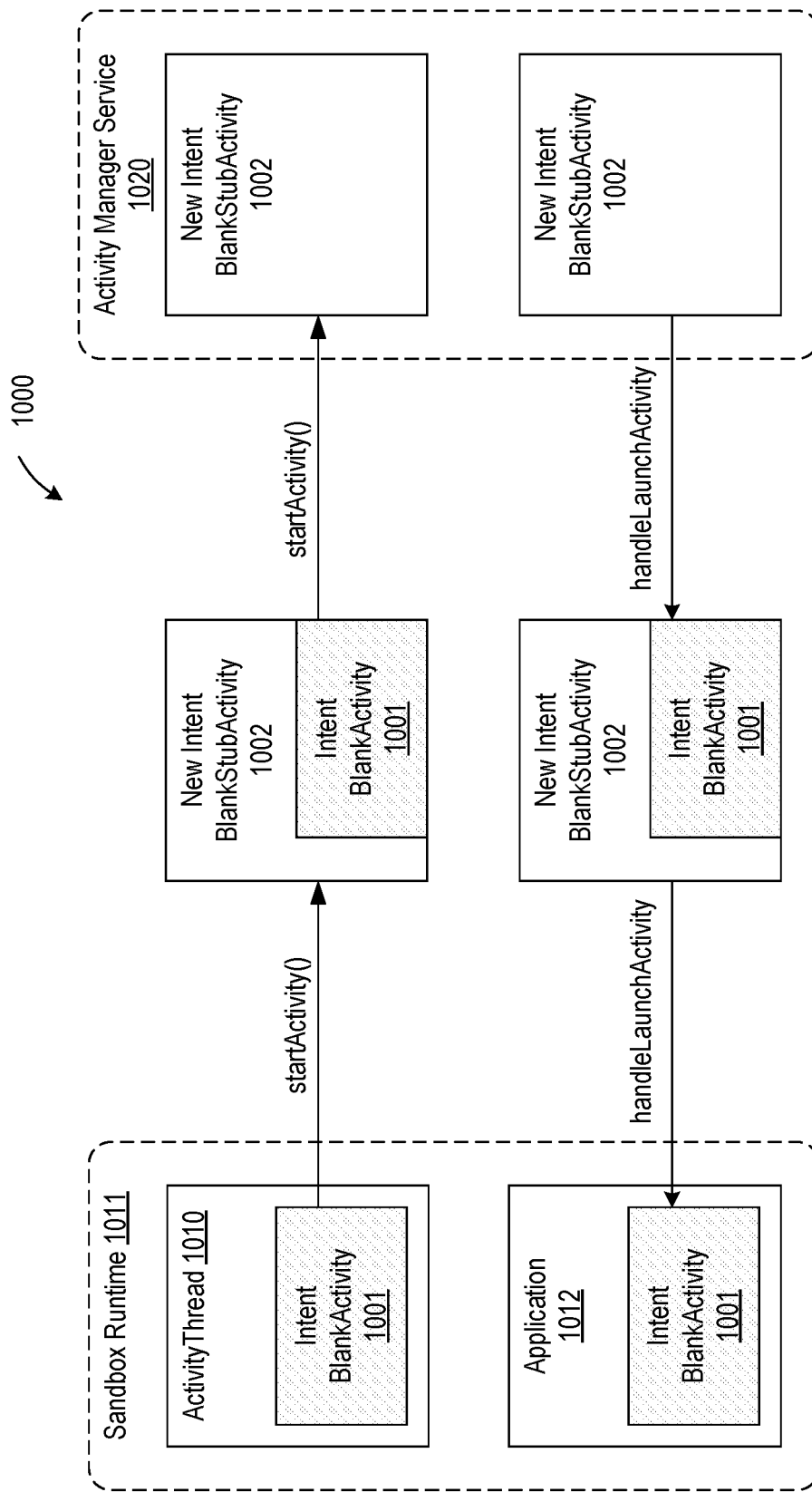
FIG. 10 is a diagram illustrating another example process for executing an application.

FIG. 10 is another diagram illustrating an example of a class or activity start process 1000. For example, sandbox runtime 1011 may be an example of sandbox runtime 701 and AMS 1020 may be an example of AMS 711 that is hosted on operating system 703 as described in FIG. 7.

Here, ActivityThread 1010 uses a startActivity( ) call to request a class or activity. In some embodiments, the startActivity( ) indicates a requested activity as a parameter (e.g., a self-defined member variable) provided by the requesting application. Sandbox runtime 1011 examines the startActivity( ) call and determines that the requested class or activity is intent BlankActivity 1001. Sandbox runtime 1011 then looks up in its own placeholder activity repository and selects an unused placeholder activity (i.e., intent blankStubActivity 1002) to wrap BlankActivity 1001. In some embodiments, intent blankStubActivity 1002 was previously registered to comply with various AMS 1020 checks that require activities and classes be registered with the operating system. BlankActivity 1001, while wrapped in intent blankStubActivity 1002, is then sent to AMS 1020.

As described above, the requested intent (i.e., intent BlankActivity 1001) is passed to AMS 1020 using with the placeholder intent (i.e., new Intent BlankStubActivity 1002). The handleLaunchActivity( ) function receives the placeholder intent (with new Intent BlankStubActivity 1002), extracts the requested intent, and reconstructs the requested activity (i.e., intent BlankActivity 1001). At this point, an activity of the application, which is not pre-registered in sandbox runtime's manifest, is successfully launched in its native form. The requested activity is in turn provided to application 1012, which may utilize the requested activity to continue operating within sandbox runtime 1011. Although application 1012 may operate within the same sandbox runtime 1011, in some embodiments application 1012 may use the requested activity on different threads or processes that are different from ActivityThread 1010.

Using process 1000, a variety of system-defined classes may be launched to facilitate the operation of applications. These classes include the activity class, service class, content provider class, and broadcast receiver class. The activity class is used to run user-interactive code that facilitate user interaction functionality (e.g., clicking a button or playing a video). To prevent pauses in user interaction functionality, the activity class does not wait if code is slow or not responsive. Rather, the system will terminate non-responsive activities. This may manifest as an application not responding (ANR) error. The service class is used to execute code that is not directly apparent to a user (e.g., background processes). For example, a service class may execute code for playing music in the background. The content provider class facilitates the sharing of inter-application information. For example, a phone application may share a contact list of a user with an email application. The broadcast receiver class is used to monitor system events such as the reception of global positioning system (GPS) location data. In this example, an application may utilize the broadcast receiver class to monitor for when GPS location is received.

Monitoring Execution of an Application

Figure 11:
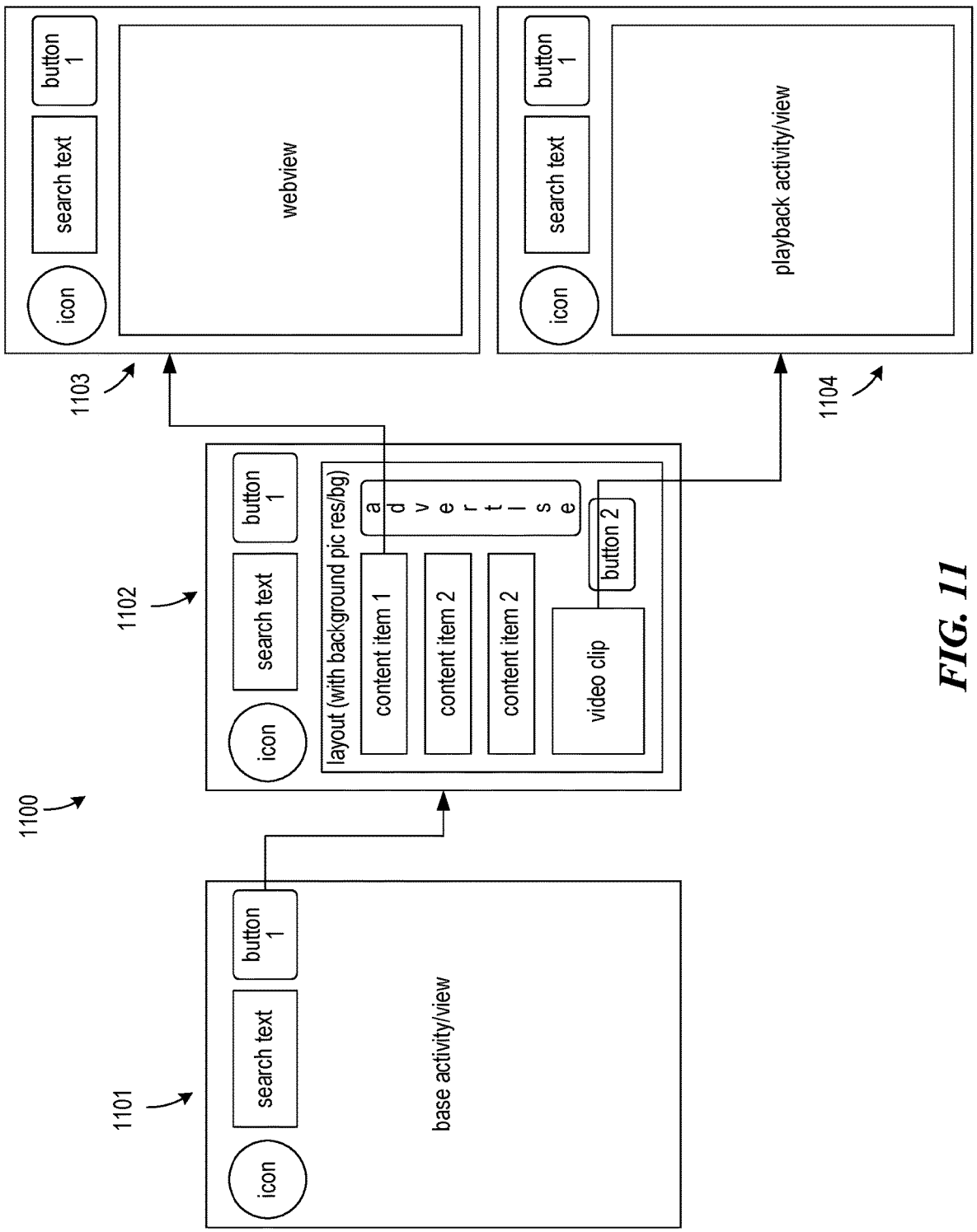
FIG. 11 is a diagram illustrating an example process for monitoring the execution of an application to record the application segments that are accessed.

FIG. 11 is a diagram illustrating an example process 1100 for monitoring the execution of an application in order to record the application segments that are accessed. Specifically, process 1100 depicts a GUI that transitions from screen 1101 to 1104. In some embodiments, as the GUI transitions from screen to screen, the meta application system may record the order in which GUI components (e.g., buttons, content items, video clips, etc.) are accessed.

The execution of the application may start at an initial application screen 1101 that contains an icon, a search text input and a button 1. After pressing button 1, a search query is performed, and the graphical user interface transitions to screen 1102. Screen 1102 is filled with several content items, a video clip, a button 2 and some advertisements. Pressing on the content items will open a webview as shown in screen 1103. Similarly, pressing on the video clip will open a playback window floating on the layout as shown in screen 1104. Here, the meta application system may note during the execution of the application, various GUI components were accessed in the following order: an icon, search text box, button 1, content items 1-2, a video clip, button 2, advertisements, a webview, a playback activity/view, etc.

Figure 12:
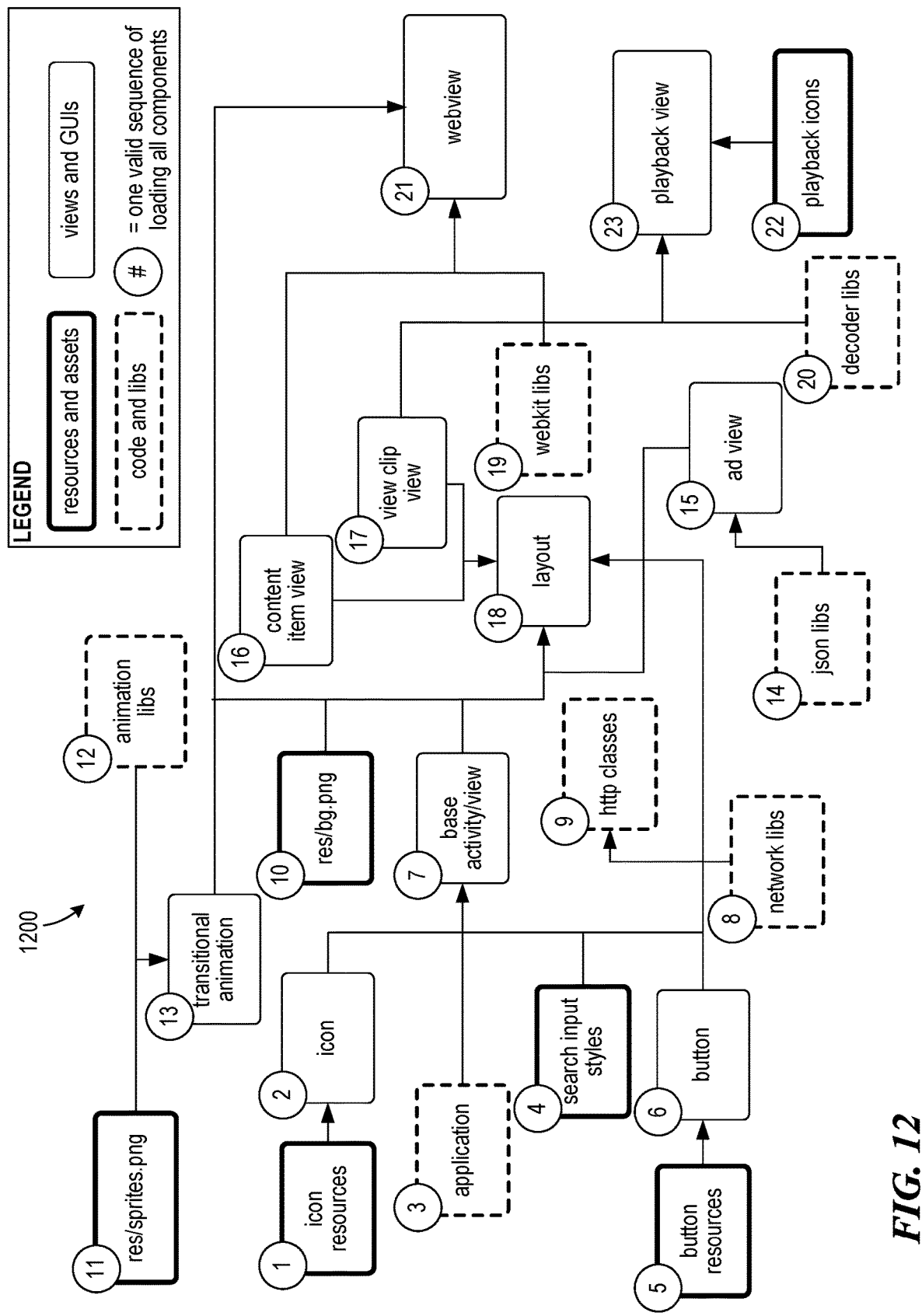
FIG. 12 is a diagram illustrating another example process for monitoring the execution of an application to record the application segments that are accessed.

FIG. 12 illustrates an example diagram 1200 that depicts the sequence of application segments and resources that are accessed during the execution of an application. In one example, process 1200 may represent the components and resources that are accessed during the execution of application as described in FIG. 11. To start, an initial screen (e.g., screen 1101 of FIG. 11) may contain a few application segments or resources such as: element 1—icon resources, element 2—icon, element 3—application, element 4—search input styles, element 5—button resources, element 6—button, element 7—base activity/view, etc. These application segments and resources are recorded in the sequence they are accessed and represent the first segments and components that are accessed. Subsequent application segments and resources are recorded as the application execution continues (e.g., execution continues to screen 1102, 1103, etc. of FIG. 11).

While the sequence of application segments that are accessed is recorded, the various segments may be categorized for parsing, indexing, and weighing. For example, the GUI and view components (e.g., element 2—icon, element 6—button, etc.) are indicated by white boxes. Resources and assets (element 1—icon resources, element 4—search input styles, element 5—button resources, etc.) are indicated by dark gray boxes. Additionally, other application data such as application code and library (e.g., element 3—application, element 8—network libs, etc.) are indicated by light gray boxes.

In some embodiments, certain categories may be given greater weight to facilitate an accurate search function. For example, GUI and view components may be given a greater weight because users may search for applications based upon keywords related to user interface components. In contrast, application code and library may be given a lesser weight because the application code may use complex terminology and programming language terms that are not familiar to the user and therefore not relevant as search terms. A person of ordinary skill in the art would recognize that other weight schemes may be assigned to optimize the search function.

Scanning an Application and Indexing GUI Components

When executing an application on a sandbox runtime, a GUI scanner can be used to dynamically detect GUI components of the application as the application is executed.

For Google™ Android applications, GUI element classes are dependent on the View Class in the Android framework. Additionally, the Android WindowManager is used to view and extract the inflated layout of each new View instance. Therefore, the Android WindowManager may be monitored to determine when a new View class instance (i.e., a new instance corresponding to a GUI element) is created. When a new GUI element is created, it can be indexed and assigned a weight to facilitate searches for each element.

Figure 13:
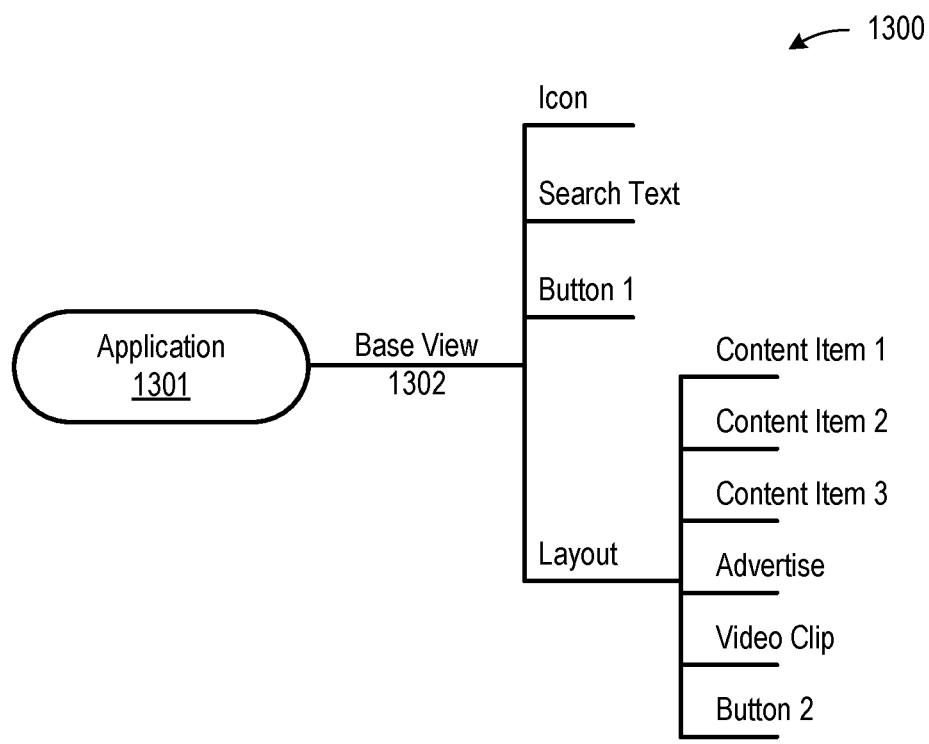
FIG. 13 is a tree diagram illustrating example application segments and example resources for the graphical user interface of the application.

FIG. 13 illustrates an example tree view 1300 of the application segments and resources contained in an application screen (e.g., screen 1101 of FIG. 11). The tree view may be used to index the GUI elements of the application screen. In some embodiments, a layout description file (e.g., an XML file describing a GUI layout) is used to indicate to Android WindowManager the absolute and/or relative coordinates of each View element in relation to the screen border. The layout description file may be parsed to identify GUI components. In some embodiments, the parsed data from the layout description file may be organized as a tree.

For example, tree 1300 begins at the root 1301 that represents the entire application. The root leads to a base view 1302, which corresponds to the initial screen or view of the application. The base view 1302 in turn leads to various elements of the screen (i.e., Icon, Search Text, Button 1, and Layout). Similarly, the layout node 1303 leads to various elements of Layout (i.e., Content Item 1, Content Item 2, Content Item 3, Advertise, Video Clip, and Button 2). The resulting tree view 1300 facilitates easier indexing and searching of the various GUI elements.

In some embodiments, the GUI scanner may determine the importance of various GUI elements. For example, the GUI scanner may determine that phrases that use bold fonts and/or located in the top center of a screen are of higher importance. Therefore, the GUI scanner may assign a higher weight to these elements. In contrast, the GUI scanner may determine that other phrases residing at a corner of the screen and/or in small gray font are of lower importance. Therefore, the GUI scanner may assign a lower weight to these elements.

Additionally, in some embodiments, GUI scanning is performed by a sandbox runtime, while parsing, indexing and weighing are performed on remote servers. For example, the GUI scanning may be performed by sandbox runtime 700 of FIG. 7, while the parsing, indexing, and weighing are each performed on servers 120, 121, 122, 202, and/or 204. The index and weighted GUI components may be stored and accessible for performing searches. For example, a user search query may be matched with the various weighted GUI elements to find the most relevant applications.

Processing System

Figure 14:
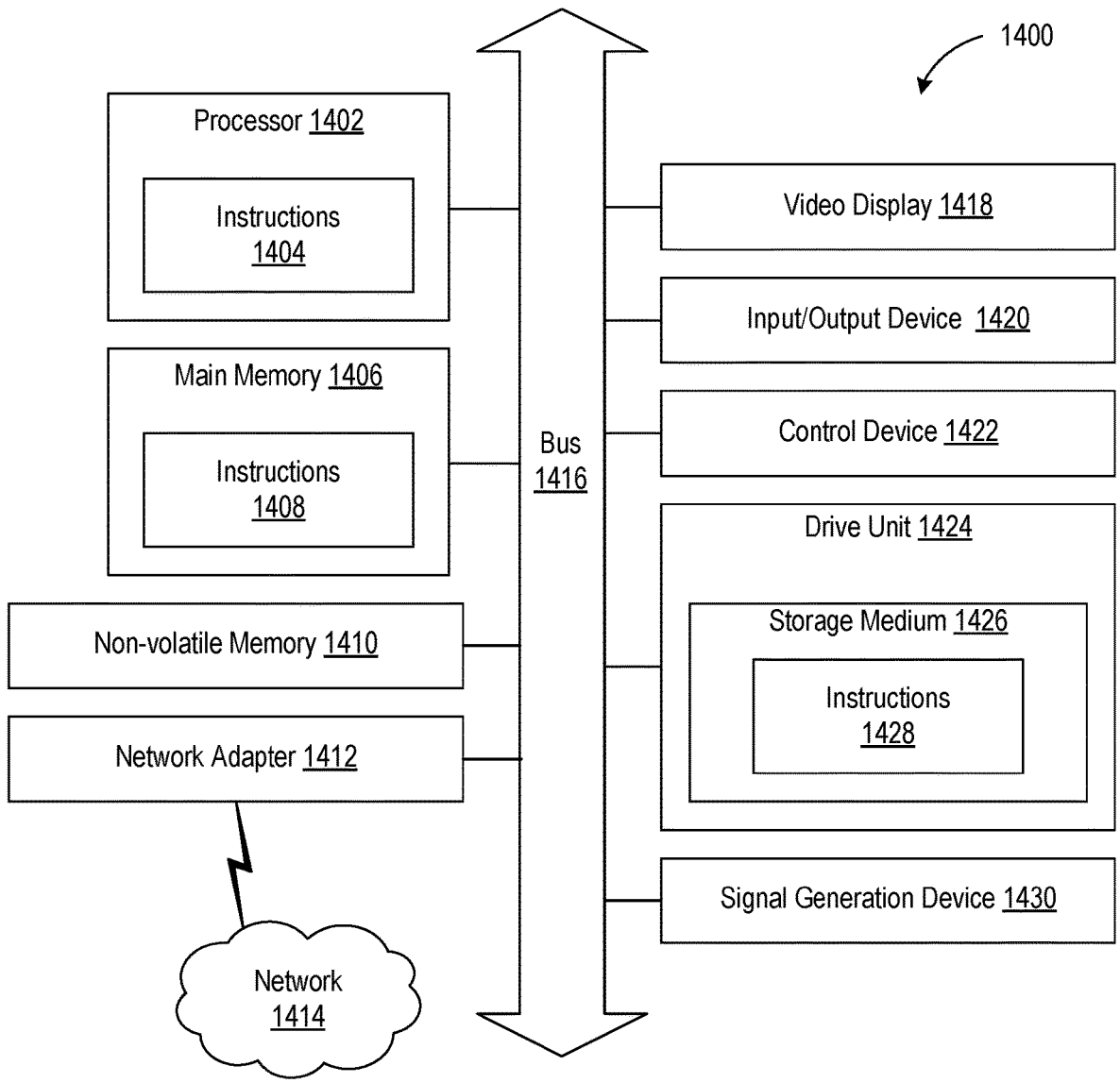
FIG. 14 is a block diagram illustrating an example processing system in which at least some operations described herein can be implemented.

FIG. 14 is a block diagram illustrating an example of a processing system 1400 in which at least some operations described herein can be implemented. For example, some components of the processing system 1400 may be implemented in a controller device.

The processing system 1400 may include one or more central processing units ("processors") 1402, main memory 1406, non-volatile memory 1410, network adapter 1412 (e.g., network interface), video display 1418, input/output devices 1420, control device 1422 (e.g., keyboard and pointing devices), drive unit 1424 including a storage medium 1426, and signal generation device 1430 that are communicatively connected to a bus 1416. The bus 1416 is illustrated as an abstraction that represents one or more physical buses and/or point-to-point connections that are connected by appropriate bridges, adapters, or controllers. The bus 1416, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 1400 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1400.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1428. The term "machine-readable medium" and "storage medium" shall also be taken to include any medium that is capable of storing, encoding, or carrying a set of instructions for execution by the processing system 1400.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1404, 1408, 1428) set at various times in various memory and storage devices in a computing device. When read and executed by the one or more processors 1402, the instruction(s) cause the processing system 1400 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1410, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1412 enables the processing system 1400 to mediate data in a network 1414 with an entity that is external to the processing system 1400 through any communication protocol supported by the processing system 1400 and the external entity. The network adapter 1412 can include a network adaptor card, a wireless network interface card, a router, an access point, a wireless router, a switch, a multilayer switch, a protocol converter, a gateway, a bridge, a bridge router, a hub, a digital media receiver, and/or a repeater.

The network adapter 1412 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the particular features and their practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

We claim:

1. A mobile device system having one or more processors for executing a mobile application, the mobile device system comprising:
   a sandbox runtime, running on a mobile device, configured to:
      execute the mobile application, without a full installation and an entire binary code base of the mobile application, by loading a minimum bootable subset (MBS) onto the mobile device from a server, the MBS being a partial set of application segments and the application segments formed by segmenting the
binary code base of the mobile application and
mapping segments of the binary code base at a
binary level;
interface between the mobile application and a host
operating system of the mobile device so that the
mobile application accesses the application segments, stored remotely at the server, as local
resources of the mobile device, wherein interfacing
between the mobile application and the host operating system of the mobile device further includes:
providing a dynamic manifest file to the host operating system of the mobile device, wherein the
dynamic manifest file includes a placeholder system defined program class used by the host operating system of the mobile device for requesting
an actual system defined class required as indicated by a current user execution progress of the
mobile application;
upon determining that the current user execution progress of the mobile application indicates that the a
next application segment is not in the MBS or local
on the mobile device system, generate a resource
request to retrieve the next application segment from
the server;
replace the placeholder system defined program class,
at the mobile device, with the actual system defined
class, wherein the actual system defined class corresponds to the next application segment to be
accessed for execution of the mobile application,
without the full installation and the entire binary
code base thereof, on the mobile device;
a graphical user interface (GUI) scanner configured to
index GUI segments by:
monitoring each application segment loaded by the
sandbox runtime;
determining whether the loaded application segments
are the GUI segments;
extracting contents of the application segments determined to be the GUI segments;
assigning weight to each of the GUI segments; and
indexing contents of the GUI segments to use the
indexed GUI segments and GUI segment weights to
match the mobile application with user search queries.

2. The mobile device system of claim 1, wherein the sandbox runtime downloads one or more application segments corresponding to requested resource indicated by the resource request.

3. The mobile device system of claim 2, wherein the resource request is a request from the mobile application for a local resource, and the one or more application segments corresponding to the requested local resource are provided to the sandbox runtime by downloading the one or more application segments from the server.

4. The mobile device system of claim 3, wherein received resources are prefetched based upon a prediction of the application segment that will be accessed according to an acyclic graph.

5. The mobile device system of claim 1, wherein the sandbox runtime generates the dynamic manifest declaring placeholder system-defined program classes.

6. The mobile device system of claim 5, wherein the sandbox runtime intercepts an intent call from the mobile application and replaces a declared placeholder system-defined program class with an actual class indicated by the intent call and required by the mobile application.

7. The mobile device system of claim 6, wherein the actual class includes one or more of: an activity class, a service class, a content provider class, and a broadcast receiver class.

8. The mobile device system of claim 1, wherein the sandbox runtime is part of a native mobile application that is installed on the host operating system of the mobile device.

9. The mobile device system of claim 1, wherein the sandbox runtime is further configured to:
predict, based on (1) an acyclic graph that reflects a current state of the mobile application and (2) a probability of the next application segment needed by the mobile application, the next application segment.

10. The mobile device system of claim 1, wherein the interfacing between the mobile application and the host operating system further includes:
intercepting an intent call from the mobile application to the host operating system, wherein the intent call is indicative of the next application segment;
parsing the intent call;
initiating an idle placeholder activity; and
transmitting the idle placeholder activity to the host operating system.

11. A method for executing on-demand mobile applications using a partial set of application segments running on a mobile device, the method comprising:
executing a mobile application, without a full installation
and an entire binary code base of the mobile application, by loading a minimum bootable subset (MBS)
onto the mobile device from a server, the MBS being a
partial set of application segments obtained by decoupling the mobile application, wherein the application
segments are generated by segmenting the binary code
base of the mobile application and mapping segments
of the binary code base at a binary level;
interfacing between the mobile application and a host
operating system of the mobile device so that the
mobile application accesses the application segments,
stored remotely at the server, as local resources of the
mobile device, wherein the interfacing between the
mobile application and the host operating system of the
mobile device further includes:
providing a dynamic manifest file to the host operating
system of the mobile device, wherein the dynamic
manifest file includes a placeholder system defined
program class used by the host operating system of
the mobile device for requesting an actual system
defined class required as indicated by a current user
execution progress of the mobile application;
upon determining that the current user execution progress
of the mobile application indicates that a next application segment is not in the MBS or local on the mobile
device system, generating a resource request to load the
next application segment from the server;
replacing the placeholder system defined program class,
at the mobile device, with the actual system defined
class, wherein the actual system defined class corresponds to the next application segment to be accessed
for execution of the mobile application, without the full
installation and the entire binary code base thereof, on
the mobile device; and
indexing graphical user interface (GUI) segments of the
application segments by:
monitoring each application segment loaded by a sandbox runtime;

determining whether the loaded application segments are the GUI segments;

extracting contents of the application segments determined to be the GUI segments;

assigning weight to each of the GUI segments; and indexing contents of the GUI segments to use the indexed GUI segments and GUI segment weights to match the mobile application with user search queries.

12. The method of claim 11, further comprising:

recording an order of the application segments accessed during the execution of the mobile application; and generating an acyclic graph of the application segments based on the recorded order of the application segments.

13. The method of claim 12, wherein generating the acyclic graph comprises:

monitoring the execution of the mobile application to determine which of the application segments are accessed and in what sequence the application segments are accessed;

creating an application segment table by mapping the accessed application segments;

generating an entry in the acyclic graph when an application segment that is accessed is matched to an application segment mapped in the application segment table; and recording the matched application segment as the entry in the acyclic graph.

14. The method of claim 13, wherein recording the order of the application segments is completed after all the application segments are loaded by the sandbox runtime at least once.

* * * * *